United States Patent [19]
Carpenter, II et al.

[11] Patent Number: 5,486,578
[45] Date of Patent: Jan. 23, 1996

[54] CURABLE SILICONE COATINGS CONTAINING SILICONE RESINS

[75] Inventors: Leslie E. Carpenter, II, Kanagawa, Japan; Robert A. Ekeland, Midland, Mich.

[73] Assignee: Dow Corning Corporation, Midland, Mich.

[21] Appl. No.: 359,311

[22] Filed: Dec. 20, 1994

Related U.S. Application Data

[63] Continuation-in-part of Ser. No. 175,830, Dec. 30, 1993, Pat. No. 5,391,673.

[51] Int. Cl.⁶ .................................................. C08F 283/00
[52] U.S. Cl. ........................ 525/478; 525/479; 427/489; 427/503; 427/515; 427/387; 522/99; 522/148
[58] Field of Search ..................... 525/478, 479; 427/489, 503, 515, 387; 522/99, 148

[56] References Cited

U.S. PATENT DOCUMENTS

| | | | |
|---|---|---|---|
| 2,676,182 | 9/1959 | Daudt et al. | 260/448.2 |
| 2,823,218 | 2/1968 | Speier et al. | 260/448.2 |
| 3,419,593 | 12/1968 | Willing | 260/448.2 |
| 3,445,420 | 5/1969 | Kookootsedes | 260/37 |
| 3,527,659 | 9/1970 | Keil | 117/145 |
| 4,123,604 | 10/1978 | Sandford, Jr. | 528/31 |
| 4,154,714 | 5/1979 | Hockemeyer et al. | 260/31.2 |
| 4,322,518 | 3/1982 | Blizzard | 528/15 |
| 4,465,818 | 8/1984 | Shirahata et al. | 528/12 |
| 4,472,563 | 9/1984 | Chandra et al. | 528/15 |
| 4,533,575 | 8/1985 | Melancon | 427/387 |
| 4,559,396 | 12/1985 | Sasaki et al. | 528/15 |
| 4,562,096 | 12/1985 | Lo et al. | 427/208.8 |
| 4,611,042 | 9/1986 | Rivers-Farrell et al. | 528/32 |
| 4,774,111 | 9/1988 | Lo | 427/387 |
| 5,036,117 | 7/1991 | Chung et al. | 522/172 |
| 5,391,673 | 2/1995 | Ekeland et al. | 528/23 |

FOREIGN PATENT DOCUMENTS 0108208 8/1983 European Pat. Off. ........ C08L 83/04

*Primary Examiner*—Melvyn I. Marquis
*Attorney, Agent, or Firm*—Timothy J. Troy

[57] ABSTRACT

The present invention relates to curable silicone coatings containing silicone resins. More particularly the present invention relates to curable silicone coating compositions comprising an olefinic organopolysiloxane, an organohydrogensiloxane, a platinum catalyst, and silicone resins in which the resins are prepared by a continuous method whereby the ratio of reactants is kept constant thus producing less variation in the final silicone resin that is produced. The silicone resins provide beneficial release properties when added to curable silicone coating compositions.

35 Claims, 1 Drawing Sheet

5,486,578

CURABLE SILICONE COATINGS CONTAINING SILICONE RESINS

This is a continuation-in-part of application Ser. No. 08/175,830, filed on Dec. 30, 1993, U.S. Pat. No. 5,391,673.

BACKGROUND OF THE INVENTION

The present invention relates to curable silicone coatings containing silicone resins. More particularly the present invention relates to curable silicone coatings containing silicone resins in which the resins are prepared by a continuous method whereby the ratio of reactants is kept constant thus producing less variation in the final silicone resin that is produced. The silicone resins produced by the unique methods disclosed herein provide beneficial properties when added to curable silicone coatings.

The use of silicone resins in silicone release coatings has been described in the art. For example, Keil, in U.S. Pat. No. 3,527,659 teaches the use, in a silicone release composition of a copolymer of $R_3SiO_{1/2}$ units and $SiO_2$ units having no more than 0.6 weight percent of silicon-bonded hydroxy groups, where R denotes a monovalent hydrocarbon radical having no more than 2 carbon atoms. Sandford, in U.S. Pat. No. 4,123,604 teaches the use of a similar copolymer of $R_3SiO_{1/2}$ units, $SiO_2$ units, and $(CH_2=CH)R_2SiO_{1/2}$ units wherein R denotes a monovalent hydrocarbon radical having no more than 2 carbon atoms in silicone release compositions curable by the addition of methylhydrogenpolysiloxanes to silicon-bonded vinyl groups which provide intermediate range release characteristics.

European Patent Application No. 0108208 teaches that unsaturated organic monomers such as alpha-olefins are employed as carrier diluents to assist in introducing high levels of vinyl resins having $R_3SiO_{1/2}$ units and $SiO_2$ units into solventless silicone release compositions. It is further taught that the silicone resin acts as a controlled release additive allowing adjustment of the release (i.e. the force in grams required to separate an adhesive from a substrate coated with a cured release coating) of the silicone release compositions.

Blizzard in U.S. Pat. No 4,322,518 teaches a composition comprising a liquid copolymeric organopolysiloxane and a vinyl or hydroxyl containing polydiorganosiloxane where the liquid copolymeric organosiloxane is prepared by forming a homogenous mixture of an organic solvent solution of a resinous copolymeric siloxane containing silicon-bonded hydroxy radicals and consists of $R_3SiO_{1/2}$ units and $SiO_2$ units where R is a hydrocarbyl radical and the ratio of $R_3SiO_{1/2}$ units to $SiO_2$ units is 0.6–0.9/1 and a liquid organohydrogenpolysiloxane, and then heating the homogenous mixture. Blizzard further discloses that the composition is used for coating paper to give controllable release of adhesives thereto.

Melancon in U.S. Pat. No. 4,533,575 discloses a process comprising the steps of forming a curable organosilicon composition by mixing an ethylenically unsaturated polysiloxane, a polysiloxane, a metal containing hydrosilylation catalyst, a 1,4 dicarboxylic acid compound as an inhibitor, and optionally an MQ resin release modifier.

Rivers-Farrell et al. in U.S. Pat. No. 4,611,042 disclose a xylene-soluble, resinous copolymer containing $SiO_2$ units, trimethylsiloxane units, and alkenyldimethylsiloxane units such as 5-hexenyldimethylsiloxane units. The resinous copolymer is disclosed as being useful as a component in silicone coatings, especially silicone release coatings, to provide intermediate range release forces against adhesives.

In contrast, the present invention is directed to a curable silicone coating composition containing uniquely prepared silicone resins. None of the references described hereinabove describe a curable silicone coating containing a silicone resin prepared according to the methods disclosed herein.

SUMMARY OF THE INVENTION

The present invention relates to a curable silicone coating composition comprising an organosilicon compound having at lease two olefinic hydrocarbon radicals per compound, at least one organohydrogensilicon compound, a platinum group metal-containing catalyst, and silicone resins prepared a continuous process.

It is an object of this invention to provide a silicone resin which can act as a high release additive in curable silicone coatings.

It is also an object of this invention to provide a release modifier for addition to curable silicone coatings.

It is an additional object of this invention to provide curable silicone coating containing a silicone resin which is characterized by beneficial release properties an varying release speeds.

It is a further object of the present invention to provide silicone resins effective in controlling release forces in pressure sensitive adhesive laminate compositions.

These and other features, objects and advantages of the present invention will be apparent upon consideration of the following detailed description of the invention.

BRIEF DESCRIPTION OF THE DRAWING

The objects of the invention will be seen by reference to the detailed description of the invention taken in connection with the accompanying drawing, in which.

DETAILED DESCRIPTION OF THE INVENTION

Figure 1:
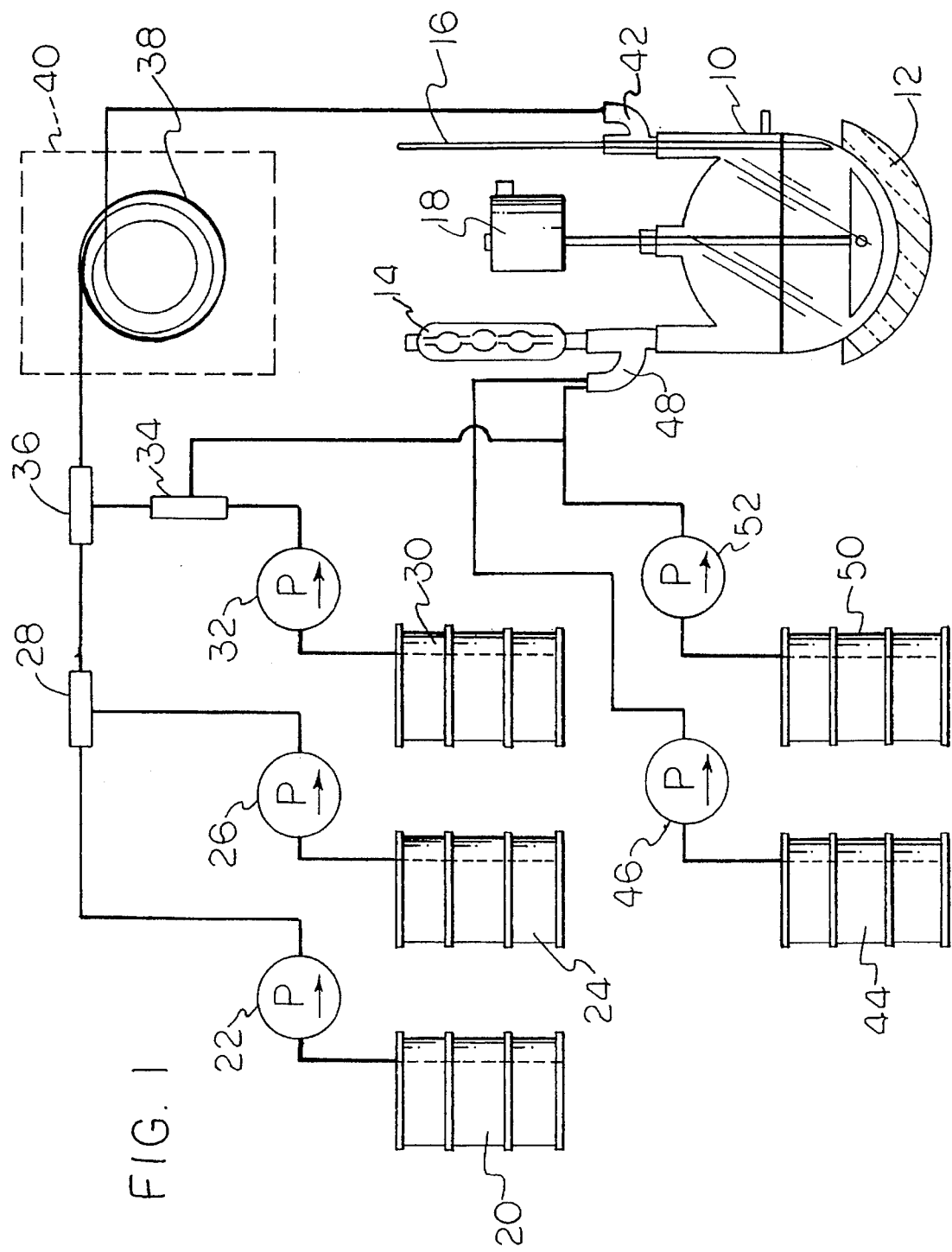
FIG. 1 is a schematic representation of a reaction apparatus for preparing the silicone resins which are added to the silicone release coatings of the instant invention. Arrows in the drawing are located on feed lines and indicate the direction of the fluid flow.

The present invention relates to a curable silicone coating composition comprising: (A) an organosilicon compound having at least two olefinic hydrocarbon radicals per compound, (B) at least one organohydrogensilicon compound, (C) a platinum group metal-containing catalyst, and (D) a silicone resin prepared by the process of: (I) mixing in a continuous manner a silane selected from the group consisting of: (a) a silane having the formula $SiX_4$ wherein X is a halogen atom or a group having the formula OR wherein R is a group selected from the group consisting of alkyl groups having from 1 to 6 carbon atoms, aryl groups, and arylalkyl groups; (b) alcohol treated halogenated silanes; and (c) alkyl silicates having units of the formula

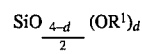

or a partial hydrolysis condensate thereof, wherein $R^1$ is a group selected from the group consisting of alkyl groups having from 1 to 6 carbon atoms, aryl groups, and arylalkyl groups, and d has a value of from 1 to 3, with a condensation catalyst; (II) adding a quenching agent to the reaction mixture of (I), whereby an aqueous layer or condensation catalyst layer and an organic-silicone resin containing layer are formed; (III) separating the aqueous layer or condensation catalyst layer from the organic-silicone resin containing layer; and (IV) stripping the organic-silicone resin containing layer, wherein the weight ratio of said silane to said condensation catalyst is constant throughout said process.

Component (A) is an organosilicon compound having at east two olefinic hydrocarbon radicals per compound. This component can be a solid or a liquid having any viscosity, such as a freely flowing, gum-like material or a hydrocarbon-soluble resin.

Multiple silicon atoms in Component (A) are linked by divalent radicals which include oxygen atoms, which provide siloxane bonds and aliphatically saturated hydrocarbon, hydrocarbon ether, halohydrocarbon ether and halohydrocarbon radicals which provide silcarbane bonds. The divalent radicals in Component (A) can be the same or different, as desired. Preferred divalent hydrocarbon radicals are 1–20 carbon atom alkylene radicals. The organopolysiloxane compounds suitable as Component (A) can be linear, branched, cyclic, and combinations thereof The olefinic hydrocarbon radicals of (A) may have from 2 to 20 carbon atoms. The olefinic hydrocarbon radicals are preferably selected from the group consisting of the vinyl radical and higher alkenyl radicals represented by the formula $-R(CH_2)_mCH=CH_2$ wherein R denotes $-(CH_2)_n-$ or $-(CH_2)_pCH=CH-$ and m has the value of 1, 2, or 3, n has the value of 3 or 6, and p has the value of 3, 4, or 5. The higher alkenyl radicals represented by the formula $-R(CH_2)_mCH=CH_2$ contain at least 6 carbon atoms. For example, when R denotes $-(CH_2)_n-$, the higher alkenyl radicals include 5-hexenyl, 6-heptenyl, 7-octenyl, 8-nonenyl, 9-decenyl, and 10-undecenyl. When R denotes $-(CH_2)_pCH=CH-$, the higher alkenyl radicals include, among others, 4,7-octadienyl, 5,8-nonadienyl, 5,9-decadienyl, 6,11-dodecadienyl and 4,8-nonadienyl. Alkenyl radicals selected from the group consisting of 5-hexenyl, 7-octenyl, 9-decenyl, and 5,9-decadienyl, are preferred. It is more preferred that R denote $-(CH_2)_n-$ so that the radicals contain only terminal unsaturation and the most preferred radicals are the vinyl radical and the 5-hexenyl radical.

Specific examples of preferred polydiorganosiloxanes for use as Component (A) include
$ViMe_2SiO(Me_2SiO)_aSiMe_2Vi$,
$HexMe_2SiO(Me_2SiO)_aSiMe_2Hex$,
$Vi_2MeSiO(Me_2SiO)_aSiMeVi_2$,
$Hex_2MeSiO(Me_2SiO)_aSiMeHex_2$, $Vi_3SiO(Me_2SiO)_aSiVi_3$,
$Hex_3SiO(Me_2SiO)_aSiHex_3$,
$PhMeViSiO(Me_2SiO)_aSiPhMeVi$,
$HexMe_2SiO(Me_2SiO)_a(MeHexSiO)_bSiMe_2Hex_2$,
$ViMe_2SiO(Me_2SiO)_a(MeViSiO)_bSiMe_2Vi$,
$Hex_2MeSiO(Me_2SiO)_a(MeHexSiO)_bSiMeHex_2$,
$Vi_2MeSiO(Me_2SiO)_a(MeViSiO)_bSiMeVi_2$,
$Hex_3SiO(Me_2SiO)_a(MeHexSiO)_bSiHex_3$,
$Vi_3SiO(Me_2SiO)_a(MeViSiO)_bSiVi_3$, wherein Me, Vi, Hex, and Ph hereinafter denote methyl, vinyl, 5-hexenyl and phenyl, respectively, a ranges from 0 to 1000 and b from 0 to 100. The value of the subscripts a and b above are such that the siloxane polymer of Component (A) has a viscosity at 25° C. of an least 25 millipascal-seconds (mPa.s). Preferably a has a value of from 10 to 200, and D has a value of from 1 to 10.

The amount of Component (A) employed varies depending on the amount of organohydrogensilicon compound (B), platinum group metal-containing catalyst (C), silicone resin (D), and the presence or absence of any optional ingredients. It is preferred that from greater than zero to 95 weight percent of (A) be used, and it is highly preferred that from 90 to 99 weight percent of (A) be employed, said weight percent being based on the total weight of the composition.

Component (B) comprises at least one organohydrogensilicon compound. Component (B) is preferably an organohydrogensilicon compound which is free of aliphatic unsaturation and contains two or more silicon atoms linked by divalent radicals, an average of from one to two silicon-bonded monovalent radicals per silicon atom and an average of at least one, and preferably two, three or more silicon-bonded hydrogen atoms per compound. Preferably the organohydrogensilicon compound (B) contains an average of three or more silicon-bonded hydrogen atoms such as, for example, 5, 10, 20, 40, 70, 100, or more. The organohydrogensiloxane compounds suitable as Component (B) can be linear, branched, cyclic, and combinations thereof.

In terms of preferred monovalent hydrocarbon radicals, examples of organopolysiloxanes of the above formulae which are suitable as the organohydrogensiloxane (B) include $HMe_2SiO(Me_2SiO)_cSiMe_2H$, $(HMe_2SiO)_4Si$, cyclo-$(MeHSiO)_c$,
$(CF_3CH_2CH_2)MeHSiO\{Me(CF_3CH_2CH_2)SiO\}_cSiHMe(CH_2CH_2CF_3)$, $Me_3SiO(MeHSiO)_cSiMe_3$,
$HMe_2SiO(Me_2SiO)_{0.5c}(MeHSiO)_{0.5c}SiMe_2H$,
$HMe_2SiO(Me_2SiO)_{0.5c}(MePhSiO)_{0.1c}(MeHSiO)_{0.4c}SiMe_2H$,
$Me_3SiO(Me_2SiO)_{0.3c}(MeHSiO)_{0.7c}SiMe_3$ and $MeSi(OSiMe_2H)_3$ where c has a value of from about 0 or 1 to about 1000.

Highly preferred linear organohydrogenpolysiloxanes have the formula $YMe_2SiO(Me_2SiO)_p(MeYSiO)_qSiMe_2Y$ wherein Y denotes a hydrogen atom or a methyl radical. An average of at least two Y radicals per compound must be hydrogen atoms. The subscripts p and q can have average values of zero, one, or more and the sum of p plus q has a value equal to c, noted above. U.S. Pat. No. 4,154,714, incorporated herein by reference shows highly-preferred organohydrogenpolysiloxanes.

Especially preferred as Component (B) are methylhydrogensiloxanes selected from the group consisting of bis(trimethylsiloxy)dimethyldihydrogendisiloxane, heptamethylhydrogentrisiloxane, hexamethyldihydrogentrisiloxane, methylhydrogencyclosiloxanes, pentamethylpentahydrogencyclopentasiloxane, pentamethylhydrogendisiloxane, polymethylhydrogensiloxanes, tetramethyltetrahydrogencyclotetrasiloxane, tetramethyldihydrogendisiloxane, and methylhydrogensiloxanedimethylsiloxane copolymers.

The amount of Component (B) employed varies depending on the amount of olefinic organosilicon compound (A), platinum group metal-containing catalyst (C), silicone resin (D), and the presence or absence of any optional ingredients. It is preferred that from 0.5 to 90 weight percent of Component (B) be used, and it is highly preferred that from 1 to 10 weight percent of Component (B) be employed, said weight percent being based on the total weight of the composition.

Component (C) can be any platinum group metal-containing catalyst component which facilitates the reaction of the silicon-bonded hydrogen atoms of Component (B) with the silicon-bonded olefinic hydrocarbon radicals of Component (A). By platinum group it is meant herein ruthenium, rhodium, palladium, osmium, iridium and platinum.

Component (C) is preferably a platinum containing catalyst component since they are the most widely used and available and because they provide a more favorable effect for the compositions of this invention in terms of improved release force. Platinum-containing catalysts can be a compound or complex of a platinum group metal. A preferred platinum-containing catalyst component is a form of chloroplatinic acid, either as the commonly available hexahydrate form or as the anhydrous form, as taught by Speier, U.S. Pat. No. 2,823,218 incorporated herein by reference. A particularly useful catalyst is the composition that is obtained when chloroplatinic acid is reacted with an aliphatically unsaturated organosilicon compound such as divinyltetramethyldisiloxane, as disclosed by Willing, U.S. Pat. No. 3,419,593, incorporated herein by reference, because of its easy dispersibility in organosilicon systems.

The amount of platinum group metal-containing catalyst (C) that is used is not narrowly limited as long as there is a sufficient amount to accelerate a room temperature reaction between the silicon-bonded hydrogen atoms of Component (B) with olefinic hydrocarbon radicals of Component (A) and not so much as to make its action uncontrollable by the use of an inhibitor. The exact necessary amount of this catalyst component will depend on the particular catalyst utilized and is not easily predictable. However, for platinum containing catalysts the amount can be as low as one part by weight of platinum for every one million parts by weight of Component (A). Component (C) is preferably added at an amount of 10 to 10,000 parts for every one million parts of (A), and it is highly preferred that the amount is at 50 to 250 parts by weight of platinum for every one million parts by weight of (A).

The silicone resin (D) is prepared by the process described hereinabove. Step (I) of this process comprises mixing in a continuous manner one of the above described silanes (a, b, or c) with a condensation catalyst. Herein the term "continuous manner" generally denotes that fresh starting materials are continuously fed (supplied) to any suitable mixing apparatus such as a static mixer or a mix loop. Silane (a) is a silane having the formula $SiX_4$ wherein X is a halogen or a group having the formula OR wherein R is a group selected from the group consisting of alkyl groups having from 1 to 6 carbon atoms, aryl groups, and arylalkyl groups. Halogens suitable as X include fluorine, chlorine, bromine, and iodine. It is preferred that X is chlorine, and thus preferred as silane (a) is tetrachlorosilane ($SiCl_4$). X in silane (a) of step (I) can also be a group having the formula OR wherein R is a group selected from the group consisting of alkyl groups having from 1 to 6 carbon atoms, aryl groups, and arylalkyl groups. Alkyl groups suitable as R include methyl, ethyl, propyl, butyl, and hexyl, aryl groups are exemplified by phenyl and naphthyl, and arylalkyl groups are exemplified by groups such as phenylmethyl, phenylethyl, phenylpropyl, phenylhexyl, and phenyloctyl. Therefore silane (a) can be a tetra-alkoxysilane such as a tetramethoxysilane, tetraethoxysilane, or tetrapropoxysilane. The preferred alkoxysilanes are tetramethoxysilane and tetraethoxysilane.

The silane of step (I) can also be (b) an alcohol-treated halogenated silane. Halogenated silanes are exemplified by silanes such as bromosilanes, chlorosilanes, and fluorosilanes. Preferred silanes have the formula $R^2R^3R^4SiY$ wherein $R^2$, $R^3$ and $R^4$ are selected from hydrogen, alkyl groups having from 1 to 12 carbon atoms, alkenyl groups having from 2 to 12 carbon atoms, aryl groups, arylalkyl groups, and perfluoroalkylethyl groups having the formula $C_nF_{2n+1}CH_2CH_2$ where n is 1 to 6, and Y is a halogen atom. The groups $R^2$, $R^3$, and $R^4$ can be the same or different as desired. Alkyl groups suitable as $R^2$, $R^3$, or $R^4$ include methyl, ethyl, propyl, butyl, hexyl, and octyl, aryl groups are exemplified by phenyl and naphthyl, arylalkyl groups are exemplified by groups such as phenylmethyl, phenylethyl, phenylpropyl, phenylhexyl, and phenyloctyl, and perfluoroalkylethyl groups include perflouromethylethyl, perfluorodiethyl, perflourobutylethyl, and perfluoroocylethyl. Alkenyl groups suitable as $R^2$, $R^3$ and $R^4$ include vinyl and 5-hexenyl. Halogens suitable as Y for silane (b) include fluorine, chlorine, bromine, and iodine. It is preferred that Y is chlorine. Preferred silanes having the formula hereinabove include trimethylchlorosilane, triethylchlorosilane, trimethylbromosilane, triethylbromosilane, trimethylfluorosilane, triethylfluorosilane, dimethylvinylchlorosilane, and dimethyl-5-hexenylchlorosilane. The silanes delineated hereinabove are treated with an alcohol prior to their use. Alcohols suitable for treating the silanes hereinabove prior to their use include methanol, ethanol, propanol, butanol, hexanol, octanol, isopropanol, isobutanol, allyl alcohol, cyclohexanol, and benzyl alcohol. Preferred alcohols for treating the silanes exemplified above are ethanol, methanol, and isopropanol. The silanes may be treated with alcohol using any suitable means of application such as mixing with a spatula or a mechanical stirrer as long as the silane has been brought into contact with the alcohol prior to its use as silane (b). Preferably the alcohol is simply mixed with the silane prior to its use. The ratio of silane to alcohol is not critical as long as at least one weight percent of alcohol is used to treat the silane, said weight percent being based on the total weight of silane and alcohol.

The silane of step (I) can also be (c) an alkyl silicate having units of the formula

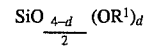

or a partial hydrolysis condensate thereof, wherein $R^1$ is a group selected from the group consisting of alkyl groups having from 1 to 6 carbon atoms, aryl groups, and arylalkyl groups, and d has a value of from 1 to 3, Thus $R^1$ is exemplified by alkyl groups such as methyl, ethyl, propyl, butyl, pentyl, and hexyl, by aryl groups such as monocyclic aryl groups exemplified by phenyl and naphthyl, and by arylalkyl groups such as phenylmethyl, phenylethyl, phenylpropyl, phenylhexyl, and phenyloctyl. Examples of the alkyl silicate or partial hydrolysis condensates thereof to be used as silane (c) include tetraethylsilicate, tetramethylsilicate, tetrapropylsilicate, ethylpolysilicate, methylpolysilicate, and propyl polysilicate. Preferred as an alkyl silicate is ethylpolysilicate.

The amount of silane employed varies depending on the amount of condensation catalyst and quenching agent (both are delineated hereinbelow) that is employed. It is preferred that from 5 to 75 weight percent of the silane be used, and it is highly preferred that from 30 to 40 weight percent of silane be employed, said weight percent being based on the total weight of the reactants (i.e. silane, catalyst, quenching agent, and any optional ingredients).

One of the silanes (a,b, or c) described hereinabove is then mixed with a condensation catalyst in Step (I). The condensation catalyst serves a dual function, one is to promote the hydrolysis of alkoxysilanes to silanol (SiOH) and alcohol, and two to catalyze the condensation of two silanol groups to form SiOSi bonds and water. The condensation catalyst can also function to promote a reaction between alkoxysilanes and silanols to form SiOSi bonds and alcohol. The condensation catalyst is preferably an organic or inorganic protic acid. The condensation catalysts are exemplified by inorganic acids such as hydrochloric acid (HCL), hydrobromic acid (HBr), hydrogen iodide (HI), nitric acid ($HNO_3$), sulfuric acid ($H_2SO_4$), phosphoric acid ($H_3PO_4$), sulfonic acids (for example trifluoromethane sulfonic acid), and carbonic acid, and by organic acids such as acetic acids (for example trifluoroacetic acid), propionic acid, formic acid, benzoic acid, and salicylic acid, dicarboxylic acids such as oxalic acid, phthalic acid, sebacic acid, and adipic acid, and fatty acids such as oleic acid, palmitic acid, stearic acid, and phenylstearic acid. It is preferred to employ a condensation catalyst selected from hydrochloric acid, sulfuric acid, and sulfonic acids.

It is preferred to use an aqueous solution of the condensation catalyst hereinabove. The aqueous solution of catalyst must contain at least 5 weight percent of one of the catalysts delineated hereinabove and, in particular, the use of an aqueous solution of catalyst which contains at least 10 weight percent of catalyst is preferred.

The amount of condensation catalyst employed varies depending on the amount of silane and quenching agent that is employed. It is preferred that from 1 to 40 weight percent of the condensation catalyst be used, and it is highly preferred that from 5 to 15 weight percent of condensation catalyst be employed, said weight percent being based on the total weight of the reactants.

The addition of the condensation catalyst to the silane results in the polymerization of the mixture of step (I) to form a reaction mixture. Herein the term "polymerization" generally denotes an acid catalyzed condensation of silicic acid derived from alkoxy group containing silanes. Polymerization of the mixture of (I) preferably occurs in an age leg. The age leg consists of a length of pipe with sufficient volume to achieve the desired polymerization time (i.e. residence time) at the flow rates employed in the reaction.

Step (II) comprises adding a quenching agent to the reaction mixture of (I) whereby an aqueous layer or a condensation catalyst layer and an organic-silicone resin containing layer are formed. Herein the term "quenching" (or capping) generally denotes the process of limiting further condensation of the silicic acid by blocking reactive sites with one or more compounds. The quenching agent is preferably a silane having the formula $R^5R^6R^7SiZ$ wherein $R^5$, $R^6$ and $R^7$ are selected from hydrogen, alkyl groups having from 1 to 12 carbon atoms, alkenyl groups having from 2 to 12 carbon atoms, aryl groups, arylalkyl groups, and perfluoroalkylethyl groups having the formula $C_nF_{2n+1}CH_2CH_2$ where n is 1 to 6, and Z is a halogen atom or is a group having the formula $OR^8$ wherein $R^8$ is a group selected from the group consisting of alkyl groups having from 1 to 6 carbon atoms, aryl groups, and arylalkyl groups. The groups $R^5$, $R^6$, and $R^7$ can be the same or different as desired Alkyl groups suitable as $R^5$, $R^6$, or $R^7$ include methyl, ethyl, propyl, butyl, hexyl, and octyl, aryl groups are exemplified by phenyl and naphthyl, arylalkyl groups are exemplified by groups such as phenylmethyl, phenylethyl, phenylpropyl, phenylhexyl, and phenyloctyl, and perfluoroalkylethyl groups include perflouromethylethyl, perfluorodiethyl, perflourobutylethyl, and perfluorooctylethyl. Alkenyl groups suitable as $R^5$, $R^6$, or $R^7$ include vinyl and 5-hexenyl. Halogens suitable as Z include fluorine, chlorine, bromine, iodine, and astatine. It is preferred that Z is chlorine. The alkyl groups, aryl groups, and arylalkyl groups for $R^8$ are as delineated above, including preferred embodiments thereof.

The quenching agent can also be a disiloxane having the formula $(R^5R^6R^7Si)_2O$ wherein $R^5$, $R^6$ and $R^7$ are all defined as above. The groups $R^5$, $R^6$, and $R^7$ can be the same or different as desired. Alkyl groups suitable as $R^5$, $R^6$, or $R^7$ in the disiloxane are exemplified by methyl, ethyl, propyl, butyl, hexyl, and octyl, aryl groups are exemplified by phenyl and naphthyl, arylalkyl groups are exemplified by groups such as phenylmethyl, phenylethyl, phenylpropyl, phenylhexyl, and phenyloctyl, and perfluoroalkylethyl groups include perflouromethylethyl, perfluorodiethyl, perflourobutylethyl, and perfluorooctylethyl. Alkenyl groups suitable as $R^5$, $R^6$, or $R^7$ in the disiloxanes include vinyl and 5-hexenyl. Examples of the disiloxanes suitable for preparation of the silicone resin (D) include tetramethyldisiloxane, hexamethyldisiloxane, tetramethyldivinylsiloxane, tetramethyldi-5-hexenylsiloxane, tetramethyl-3,3,3-trifluoropropyldisiloxane, tetramethyldiethylsiloxane, tetramethyldiphenyldisiloxane, and diethyldiphenyldivinyldisiloxane. A mixture of two or more species of disiloxane can also be used. Preferred disiloxanes are hexaalkyldisiloxanes, especially hexamethyldisiloxane.

An organic solvent which does not directly participate in the reaction may be optionally added to or mixed with the quenching agent in order to dilute the quenching agent or in order to provide for thorough mixing of the aqueous layer/organic Layer. Examples of said organic solvents include methanol, ethanol, isopropanol, acetone, tetrahydrofuran (THF), methylene chloride, acetonitrile, methyl ethyl ketone, white spirits, chlorinated hydrocarbons and the like, benzene, toluene, and xylene. Preferred organic solvents include heptane and xylene. The addition of the quenching agent to the mixture of (I) results in the separation of the solution into two layers, an aqueous layer, and an organic-silicone resin containing layer.

The amount of quenching agent employed varies depending on the amount of silane, condensation catalyst, and on the amount of organic solvent (if desired) that is employed. It is preferred that from 5 to 75 weight percent of the quenching agent be used, and it is highly preferred that from 20 to 40 weight percent of quenching agent be employed, said weight percent being based on the total weight of the reactants.

Step (III) comprises separating the aqueous layer or condensation catalyst layer from the organic-silicone resin containing layer. Separation of the organic-silicone-resin containing layer and the aqueous layer/condensation catalyst layer comprises allowing the non-miscible layers to phase separate and then drawing the less dense layer off the top and the more dense layer off the bottom of a separation vessel. The manner in which the two layers are mechanically separated is not critical as long as the two layers are isolated. Separation of the two layers may be accomplished by any of the separation methods well known to those skilled in the art. Separation of the two layers may be accomplished by evaporation, distillation, drying, gas absorption, sedimentation, solvent extraction, press extraction, adsorption, and filtration. It is preferred that the separation of the aqueous layer/condensation catalyst layer from the organic-silicone resin containing layer be accomplished by sedimentation.

Step (IV) comprises stripping the organic-silicone resin containing layer. The organic-silicone resin containing layer is stripped to remove any excess quenching agent from the mixture. Methods of stripping volatile components are well known in the art and need no extensive delineation herein. Any method of removing volatile components can be used in the present invention, such methods exemplified by, but not limited to, distillation, or evaporation, (e.g. by passage of steam, air, or other gas through the liquid mixture), or the use of molecular stills, rotoevaporators, and wipe film evaporators. The preferred method of stripping the organic-silicone resin containing layer is by vacuum distillation.

It is critical that the weight ratio of the silane delineated above to the condensation catalyst delineated above is constant throughout the above preparation of silicone resin (D). The maintenance of this ratio allows the silicone resin to be prepared in a continuous manner.

Once the silicone resin is prepared by the method described above, it is then added to components (A), (B), and (C) delineated above to form a curable coating composition. The amount of Component (D) employed varies depending on the amount of olefinic siloxane (A), organohydrogensilicon compound (B), platinum group metal-containing catalyst (C), and the presence or absence of any optional ingredients. It is preferred that from greater than 1 to 90 weight percent of (D) be used, and it is highly preferred that from 10 to 60 weight percent of (D) be employed, said weight percent being based on the total weight of the composition.

The compositions of the present invention can further comprise an inhibitor. The inhibitor can be any material that is known to be, or can be, used to inhibit the catalytic activity of platinum group metal-containing catalysts. By the term "inhibitor" it is meant herein a material that retards the room temperature curing of a curable mixture of Components (A), (B), and (C), when incorporated therein in small amounts, such as less than 10 percent by weight of the composition, without preventing the elevated curing of the mixture. Examples suitable inhibitors include ethylenically or aromatically unsaturated amides, acetylenic compounds, ethylenically unsaturated isocyanates, olefinic siloxanes, unsaturated hydrocarbon diesters, conjugated ene-ynes, hydroperoxides, nitriles, and diaziridines.

Preferred inhibitors include acetylenic alcohols such as those disclosed in U.S. Pat. No. 3,445,420, including ethynylcyclohexanol and methylbutynol, unsaturated carboxylic esters such as diallyl maleate and dimethyl maleate, maleates and fumarates such as those disclosed in U.S. Pat. Nos. 4,562,096 and 4,774,111, including diethyl fumarate, diallyl fumarate, and bis-(methoxyisopropyl) maleate, and conjugated ene-ynes such as those disclosed in U.S. Pat. Nos. 4,465,818, 4,472,563, and 4,559,396. The above-mentioned patents are incorporated herein by reference to teach how to prepare compounds which are suitable for use as an inhibitor in the compositions of this invention. Maleates and fumarates are the preferred inhibitors for the compositions of this invention.

The maleates and fumarates that are preferred as inhibitors have the formula $R^3(OQ)_tO_2CCH=CHCO_2(QO)_tR^3$ wherein $R^3$ denotes a monovalent hydrocarbon radical having from 1 to 10 carbon atoms and each Q denotes, independently, an alkylene radical having from 2 to 4 carbon atoms. $R^3$ can be, for example, an alkyl radical such as methyl, ethyl, propyl, isopropyl, butyl, pentyl, or hexyl; an aryl radical such as phenyl or benzyl; an alkenyl radical such as vinyl or allyl; alkynyl radicals; or a cyclohydrocarbon radical such as cyclohexyl. Q can be for example, —$CH_2CH_2$—, —$CH_2(CH_3)CH$—, —$CH_2CH_2CH_2$—, —$CH_2CH_2CH_2CH_2$—, —$CH_2(CH_3CH_2)CH$— and —$CH_2CH_2(CH_3)CH$—. The individual $R^3$ radicals and Q radicals of the maleates and fumarates can be identical or different, as desired. The value of subscript t in the formula immediately above can have a value equal to zero or 1. The individual values of t can be identical or different, as desired. Bismethoxyisopropyl maleate and diethyl fumarate are preferred as inhibitors for the present invention.

The amount of inhibitor to be used is not critical and can be any amount that will retard the above described catalyzed reaction at room temperature while not preventing said reaction at elevated temperature. No specific amount of inhibitor can be suggested to obtain a specified bath life at room temperature since the desired amount of any particular inhibitor to be used will depend upon the concentration and type of the platinum group metal containing catalyst, the nature and amounts of Components (A), (B), (C), and (D), and the presence or absence of optional ingredients. It is preferred that from zero to 10 weight percent of inhibitor be used, said weight percent being based on the total weight of the composition. It is also preferred that from 0.5 to 1.5 percent of inhibitor be added to the total formulation if a maleate inhibitor is employed and from 0.8 to 2.0 percent if a fumarate inhibitor is used.

The compositions of the present invention can additionally comprise a bath life extender compound in a total amount sufficient to further retard the curing reaction at room temperature such as those described in Chung et al., U.S. Pat. No. 5,036,117 incorporated herein by reference. Examples of suitable bath life extender compounds include compounds which contain one or more primary or secondary alcohol groups, carboxylic acids (including compounds which yield carboxylic acids when exposed to water at room temperature), cyclic ethers, and water. Included in this group are the primary and secondary alcohols; diols and triols, such as ethylene glycol, propylene glycol and glycerine; partial ethers of diols and triols, such as 2-methoxyethanol, 2-methoxypropanol, and 2-methoxyisopropanol; tetrahydrofuran; water and aqueous solutions of mineral acids, alkalis, and salts. Primary and secondary alcohols, preferably having fewer than 10 carbon atoms are the most preferred. Examples thereof include methanol, 1-butanol, 2-butanol, tetradecanol and other alkanols, such as ethanol, and normal-, and iso-propanol, iso-butanol, and the normal-, secondary-, and iso-pentanols, -hexanols, -heptanols, and -octanols; benzyl alcohol, phenol, and other aromatic alcohols such as methylphenyl carbinol, and 2-phenylethyl alcohol; allyl alcohol, and cyclohexanol. It is highly preferred that the bath life extender is benzyl alcohol or water.

The amount of bath life extender to be used is not critical and is merely that amount that will provide a longer path life for the composition than the bath life of an identical composition that does not contain the extender. The amount of Component bath life extender that is to be used can be as high as 10 percent by weight, based on the weight of Component (A). Preferably, the amount of bath life extender to be used falls within the range of 0.1 to 5 percent, and most preferably 1 to 3 percent, by weight, based on the weight of Component (A).

The compositions of the present invention can further comprise a diluent. Examples of suitable diluents include aliphatic hydrocarbons such as pentane, hexane, heptane, octane, nonane, and the like; aromatic hydrocarbons such as benzene, toluene, and xylene; ketones such as acetone, methylethyl ketone, and methylisobutyl ketone, and halogenated diluents such as fluorine-, chlorine-, and bromine-, substituted aliphatic or aromatic hydrocarbons such as trichloroethane, perchloroethylene, bromobenzene, and the like. Two or more diluents may be used together.

The amount of diluent is not critical and may be readily determined by one skilled in the art. The compositions of this invention may contain from 0 up to 90 weight percent of diluent, however it is preferred that from about 70 to 90 weight percent be employed, said weight being based on the total weight of the composition.

The present invention further relates to a curable silicone coating composition comprising: (A) an organosilicon compound having at least two olefinic hydrocarbon radicals per compound, (B) at least one organohydrogensilicon compound, (C) a platinum group metal-containing catalyst; and (D) a silicone resin prepared by the process of: (I) mixing in a continuous manner a silane selected from the group consisting of: (i) alkoxysilanes, (ii) halogenated silanes, and (iii) alkyl silicates with a silicon compound selected from the group consisting of: (iv) trialkylhalosilanes and (v) disiloxanes; (II) adding an alcohol to the mixture of (I); (III) adding water or a mixture of water and a condensation catalyst to the mixture of (II) whereby an aqueous layer and an organic-silicone resin containing layer are formed; (IV) separating the aqueous layer from the organic-silicone resin containing layer; (V) stripping the organic-silicone resin containing layer; wherein the weight ratio of said silane to said water or to said mixture of water and condensation catalyst is constant throughout said process.

components (A), (B), and (C) are as delineated above, including preferred embodiments and amounts thereof. Step (I) in the process of preparing silicone resin (D) comprises mixing, in a continuous manner, a silane selected from the group consisting of (i) alkoxysilanes, (ii) halogenated silanes, and (iii) alkyl silicates with a silicon compound selected from the group consisting of (iv) trialkylhalosilanes and (v) disiloxanes. Alkoxysilane (i) is a silane having the formula $SiOR_4$ wherein R is a group selected from the group consisting of alkyl groups having from 1 to 6 carbon atoms, aryl groups, and arylalkyl groups. Alkyl groups suitable as R are as defined above. Thus alkoxysilane (i) can be a tetra-alkoxysilane such as a tetramethoxysilane, tetraethoxysilane, or tetrapropoxysilane. The preferred alkoxysilanes are tetramethoxysilane and tetraethoxysilane. Halogenated silanes (ii) are exemplified by silanes such as bromosilanes, chlorosilanes, and fluorosilanes. Such silanes are exemplified by compounds having the formula $SiX_4$ wherein X is a halogen. Halogens suitable as X include fluorine, chlorine, bromine, and iodine. It is preferred that X is chlorine and thus preferred as silane (a) is tetrachlorosilane ($SiCl_4$).

The silane of step (I) can also be (iii) an alkyl silicate. Preferred alkyl silicates as (iii) are alkyl silicates having units of the formula

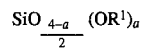

$$SiO_{\frac{4-a}{2}}(OR^1)_a$$

hydrolysis condensate thereof, wherein $R^1$ is a group selected from the group consisting of alkyl groups having from 1 to 6 carbon atoms, aryl groups, and arylalkyl groups, and a has a value of from 1 to 3. Thus $R^1$ is exemplified by alkyl groups such as methyl, ethyl, propyl, butyl, pentyl, and hexyl, by aryl groups such as monocyclic aryl groups exemplified by phenyl and naphthyl, and by arylalkyl groups such as phenylmethyl, phenylethyl, phenylpropyl, phenylhexyl, and phenyloctyl. Examples of the alkyl silicate or partial hydrolysis condensates thereof to be used as silane (iii) include ethylpolysilicate, methylpolysilicate, and propyl polysilicate. Preferred as an alkyl silicate is ethylpolysilicate.

The amount of silane employed varies depending on the amount of silicon compound, alcohol, water, and optionally condensation catalyst (all of which are delineated hereinbelow) that is employed. It is preferred that from 5 to 75 weight percent of the silane be used, and it is highly preferred that from 30 to 40 weight percent of silane be employed, said weight percent being based on the total weight of reactants.

The silane of Step (I) is then mixed with a silicon compound selected from the group consisting of (iv) trialkylhalosilanes and (v) disiloxanes. Preferred trialkylhalosilanes have the formula $R^2R^3R^4SiY$ wherein $R^2$, $R^3$ and $R^4$ are selected from hydrogen, alkyl groups having from 1 to 12 carbon atoms, alkenyl groups having from 2 to 12 carbon atoms, aryl groups, arylalkyl groups, and perfluoroalkylethyl groups having the formula $C_nF_{2n+1}CH_2CH_2$ where n is 1 to 6, and Y is a halogen atom. The groups $R^2$, $R^3$, and $R^4$ can be the same or different as desired. Alkyl groups suitable as $R^2$, $R^3$, or $R^4$ include methyl, ethyl, propyl, butyl, hexyl, and octyl, aryl groups are exemplified by phenyl and naphthyl, arylalkyl groups are exemplified by groups such as phenylmethyl, phenylethyl, phenylpropyl, phenylhexyl, and phenyloctyl, and perfluoroalkylethyl groups include perflouromethylethyl, perfluorodiethyl, perflourobutylethyl, and perfluoroocylethyl. Alkenyl groups suitable as $R^2$, $R^3$, or $R^4$ include vinyl and 5-hexenyl. Halogens suitable as Y for silane (b) include fluorine, chlorine, bromine, and iodine. It is preferred that Y is chlorine. Preferred trialkylhalosilanes include trimethylchlorosilane, triethylchlorosilane, trimethylbromosilane, triethylbromosilane, trimethylfluorosilane, triethylfluorosilane, dimethylvinylchlorosilane, and dimethyl-5-hexenylchlorosilane.

The silicon compound can also be a disiloxane (v). Preferred disiloxanes are siloxanes having the formula $(R^5R^6R^7Si)_2O$ wherein $R^5$, $R^6$ and $R^7$ are all defined as above. The groups $R^5$, $R^6$, and $R^7$ can be the same or different as desired. Alkyl groups suitable as $R^5$, $R^6$, $R^7$ are exemplified by methyl, ethyl, propyl, butyl, hexyl, and octyl, aryl groups are exemplified by phenyl and naphthyl, arylalkyl groups are exemplified by groups such as phenylmethyl, phenylethyl, phenylpropyl, phenylhexyl, and phenyloctyl, and perfluoroalkylethyl groups include perflouromethylethyl, perfluorodiethyl, perflourobutylethyl, and perfluorooctylethyl. Alkenyl groups suitable as $R^5$, $R^6$, or $R^7$ include vinyl and 5-hexenyl. Examples of the disiloxanes which can be used include tetramethyldisiloxane, hexamethyldisiloxane, tetramethyldivinylsiloxane, tetramethyldi-5-hexenylsiloxane, tetramethyl-3,3,3-trifluoropropyldisiloxane, tetramethyldiethylsiloxane, tetramethyldiphenyldisiloxane, and diethyldiphenyldivinyldisiloxane. A mixture of two or more species of disiloxane can also be used. Preferred disiloxanes are hexaalkyldisiloxanes, especially hexamethyldisiloxane.

The amount of silicon compound employed varies depending on the amount of silane, alcohol, water, and optionally condensation catalyst that is employed. It is preferred that from 5 to 75 weight percent of the silicon compound be used, and it is highly preferred that from 20 to 40 weight percent of silicon compound be employed, said weight percent being based on the total weight of reactants.

Step (II) comprises adding an alcohol to the mixture of Step (I). Alcohols suitable for use include methanol, ethanol, propanol, butanol, hexanol, octanol, isopropanol, isobutanol, allyl alcohol, cyclohexanol, and benzyl alcohol. Preferred alcohols for addition to the mixture of step (I) include ethanol, methanol, and isopropanol. The alcohol may be added to the mixture of step (I) using any suitable means such as mixing with a spatula or a mechanical stirrer. Preferably the alcohol is simply mixed in with the mixture produced by step (I).

The amount of alcohol employed varies depending on the amount of silane, silicon compound, water, and optionally condensation catalyst that is employed, it is preferred that from greater than zero to 50 weight percent of the alcohol be used, and it is highly preferred that from 5 to 20 weight percent of alcohol be employed, said weight percent being based on the total weight of reactants.

Step (III) comprises adding water or a mixture of water and a condensation catalyst to the mixture of (II) whereby an aqueous layer and an organic-silicone resin containing layer are formed. Thus water or a mixture of water and a condensation catalyst is added to the mixture produced by step (II). The condensation catalyst serves a dual function, one is to promote the hydrolysis of alkoxysilanes to silanol (SiOH) and alcohol, and two to catalyze the condensation of two silanol groups to form SiOSi bonds and water. The condensation catalyst can also function to promote a reaction between alkoxysilanes and silanols to form SiOSi bonds and alcohol. This reaction is less likely due to the acidic conditions present during preparation of the silicone resin. The condensation catalyst is as delineated hereinabove. It is preferred to employ a condensation catalyst selected from hydrochloric acid, sulfuric acid, and sulfonic acids.

It is preferred to use an aqueous solution of the condensation catalyst hereinabove. The aqueous solution of catalyst must contain at least 5 weight percent of one of the catalysts delineated hereinabove and, in particular, the use of an aqueous solution of catalyst which contains at least 10 weight percent of catalyst is preferred. The addition of water or a water/condensation catalyst mixture to the mixture of step (II) results in the formation of an aqueous layer and an organic-silicone resin containing layer.

The amount of water employed varies depending on the amount of silane, silicon compound, alcohol, and optionally condensation catalyst that is employed. If water only is used in step (III) then it is preferred that from 5 to 50 weight percent of water be used, and it is highly preferred that from 20 to 30 weight percent of water be employed, said weight percent being based on the total weight of reactants. However, if a mixture of water and condensation catalyst is employed then it is preferred that the water and condensation catalyst be added at a ratio of from 99 weight percent of water to 1 weight percent of catalyst, and it is highly preferred that it be added at a ratio of from 90 weight percent of water to 10 weight percent of catalyst.

Step (IV) comprises separating the aqueous layer from the organic-silicone resin containing layer. The separation of the two layers may be accomplished as is described above including preferred embodiments thereof.

Step (V) comprises stripping the organic-silicone resin containing layer. Stripping of the organic-silicone resin containing layer may be accomplished as is described above including preferred embodiments thereof.

The preparation of the silicone resin can further comprise heating the mixture after step (III). The mixture is preferably heated at a temperature of about 20° C. to 100° C. and more highly preferred is that the mixture be heated at a temperature of from about 40° to 70° C.

It is critical that throughout the preparation of the silicone resin (D) that the weight ratio of the silane delineated above to the condensation catalyst, water, or mixture thereof, delineated above, is constant. The maintenance of this weight ratio allows the silicone resin to be prepared in a continuous manner.

The amount of Component (D) employed varies depending on the amount of olefinic siloxane (A), organohydrogensilicon compound (B), platinum group metal-containing catalyst (C) and the presence or absence of any optional ingredients. It is preferred that from greater than 1 to 90 weight percent of (D) be used, and it is highly preferred that from 10 to 60 weight percent of (D) be employed, said weight percent being based on the total weight of the composition.

The curable coating compositions above can further comprise an inhibitor, bath life extender, and/or diluent. The inhibitor, bath life extender, and/or diluent are all as delineated hereinabove, including amounts and preferred embodiments thereof.

The compositions of this invention can contain any optional components commonly used in platinum group metal catalyzed organosilicon compositions, such as reinforcing and extending fillers, hydrocarbons and halohydrocarbons free of aliphatic unsaturation, colorants, stabilizers, adhesion modifiers, adhesive-release modifiers, etc. In particular, the coating compositions of this invention which have adhesive-releasing properties can further comprise the well-known high release additives of the art.

The compositions of this invention can be prepared by homogeneously mixing Components (A), (B), (C), (D), and any optional components in any order, using any suitable mixing means, such as a spatula, a drum roller, a mechanical stirrer, a three-roll mill, a sigma blade mixer, a bread dough mixer, and a two-roll mill. The order of mixing Components (A) to (D) and any optional components is not critical, however, it is highly preferred that Components (A), (C), and (D) be brought together in the presence of Component (B) and optionally an inhibitor, most preferably in a final mixing step. It is highly preferred to admix an inhibitor (if used) to Component (C) followed by (A) and (D), then a bath life extender (if used), and finally (B).

The present invention further relates to a process for preparing a laminate of a substrate and an adhesive wherein the adhesive will release from the substrate, the process comprising the steps of: (I) coating a curable silicone coating composition on the surface of the substrate wherein the composition comprises either of the curable coating compositions described hereinabove, (II) exposing the coating to an energy source selected from the group consisting of (i) heat and (ii) actinic radiation in an amount sufficient to cure the coating, and (III) applying a pressure sensitive adhesive on the coating.

The compositions of this invention have utility as formable compositions to provide organosilicon articles such as O-rings, tubing, wire-coating, gaskets, encapsulant and sealant compositions, and as coating compositions. The compositions of the present invention have particular utility as silicone release coatings.

The silicone resins prepared in the curable coating compositions of this invention include MQ resins having various ratios of M ($R_3SiO_{1/2}$) to Q ($SiO_2$). A wide variety of silicone resins can be produced according to the methods described hereinabove and their structure is dependent on the creativity of addition and selection of reactants.

The silicone resins (D) can also have organofunctionality incorporated into their resin structure by the choice of the starting silanes. Through the addition of combinations of the above delineated starting materials, a variety of silicone resins can be produced.

it is preferred that the silicone resins (D) are MQ siloxane resins having a predetermined content of SiH groups. MQ siloxane resins where less than 10% of the monovalent groups have SiH functionality can be produced. The MQ resins suitable in the compositions of this invention may have up to 5% by weight of groups of the formula OH and OR. The reactants above can be sequentially or concurrently added to derive a novel resin having desired physical and chemical properties. All of the silicone resins (D) have a high purity due to the method of manufacture. The acid or base impurities are often very low.

The reaction temperature during the preparation of the silicone resins (D) is in the range from 20° C. to 100° C. or preferably is maintained at a constant temperature of between 40° and 70° C.

A specific example of a reaction apparatus for preparation of the silicone resins (D) is shown in FIG. 1 of the drawing.

Considering the drawing in greater detail, FIG. 1 shows a twelve liter five neck round bottom flask (10) placed in heating mantle (12). One neck was fitted with reflux condenser (14), one neck was fitted with thermocouple (16), and the center neck was equipped with mechanical stirrer (18). A first tank having an inert nitrogen atmosphere (20) was connected with a feed line to a first peristaltic pump (22) and a second tank having an inert nitrogen atmosphere (24) was connected with a feed line to a second peristaltic pump (26) and set up such that the outputs of pumps (22) and (26) were combined at first static mixer (28). A third tank having an inert nitrogen atmosphere (30) was connected by a feed line to a third peristaltic pump (32) and set up such that the output of the third pump was directed to second static mixer (34). The output of first static mixer (28) was then combined with the output of third tank (30) at third static mixer (36). The output from the third static mixer (36) was fed via feed line into age leg (38), which consisted of a coil of teflon tubing of appropriate length. The age leg (38) was immersed in constant temperature bath (40) to control the reaction temperature. The output of the age leg (38) was fed to the neck (42) which was connected to the neck housing thermocouple (16) of flask (10). A fourth tank having an inert nitrogen atmosphere (44) was connected by a feed line to a fourth peristaltic pump (46) and was set up to deliver materials directly from the fourth tank (44) to the neck (48) which was connected to the neck housing reflux condenser (14) of flask (10). A fifth tank having an inert nitrogen atmosphere (50) was connected by a feed line to a fifth peristaltic pump (52) and was set up with a three way valve such that its output could either be directed directly to flask (10) through neck (48) or directed through a feed line to the second static mixer (34), where its output could be combined with the output of tank (30). It should be apparent to one skilled in the art that other reaction apparatus can be used for preparing the silicone resins of this invention.

The number average molecular weight (Mn) and weight average molecular weight (Mw) of the samples hereinbelow was determined by Gel Permeation Chromatography (GPC). The molecular weight distributions were determined by size exclusion chromatography (i.e. GPC) using chloroform as the mobile phase and infrared detection at 9.1 microns. The calibration standards were narrow molecular weight fractions of similar materials validated by vapor phase osmometry.

Polydispersity was determined by dividing the weight average molecular weight by the number average molecular weight (Mw) of the samples hereinbelow (i.e. Mw/Mn).

The measured concentration of SiH as H was measured as a percent by weight and was measured by reducing mercuric chloride with silane hydrogen. Silane hydrogen reduces mercuric chloride to liberate two moles of hydrochloric acid per mole of silane ($R_3SiH$). The liberated acid is quantitatively titrated with alcoholic potassium hydroxide and the result calculated as percent hydrogen. The ratio of M ($R_3SiO_{1/2}$) units to Q ($SiO_2$) units was determined by Silicon (29) NMR ($^{29}Si$). A ratio of the integral for the M region and the Q region on the NMR spectra was compared to determine the ratio of M units to Q units.

Example 1

A vinyl functional silicone resin was produced according to the method described hereinabove. The first tank (20) was filled with 1000 grams of tetraethylorthosilicate, 50.8 grams of tetramethyldivinyldisiloxane, and 309.6 grams of hexamethyldisiloxane. The second tank (24) was filled with 884 grams of absolute ethanol, 257 grams of concentrated hydrochloric acid (HCl), and 689 grams of water. The contents of tanks 20 and 24 were pumped together through static mixers into the agitated reactor (10) containing 500 grams of heptane at flow rates of 37.1 grams/minute (g/min.) and 52.1 g/min. respectively. The age leg (38) for this experiment consisted of 12 feet of ¼ inch OD (outer diameter) teflon tubing. When the addition was complete, the temperature was raised to 60° C. and maintained for 2 hours. The agitation was stopped and the aqueous layer drained away and the organic layer washed free of residual acid with 3 aliquots of 250 milliliters of distilled water. The organic layer was dried and stripped free of heptane solvent leaving 650 grams of a viscous resin. The GPC Mn of the silicone resin was 1485, the GPC Mw was 2062, with a polydispersity of 1.38. The vinyl content of the resin was measured at 2.5% by weight.

Example 2

Another vinyl functional silicone resin was produced according to the method described hereinabove. Tank (20) was filled with 1000 grams of tetraethylorthosilicate and 885 grams of absolute ethanol. Tank (24) was filled with 144.2 grams of distilled water and 42.2 grams of concentrated HCl. Tank (30) was filled with 576.6 grams of distilled water and 168.7 grams of concentrated HCl. Tank (44) filled with 56.1 grams of vinyldimethylchlorosilane and 586.6 grams of trimethylchlorosilane. About 71.4 grams of divinyltetramethyldisiloxane and 715 grams of hexamethyldisiloxane were added to Flask (10). For this reaction, the distance between static mixers (28) and (36) was 150 feet of ¼ inch OD teflon tubing, and age leg (38) distance of 6 feet of ¼ inch OD teflon tubing. The contents from tanks (20), (24), and (30) were pumped together at 78.8, 7.9, and 31.6 g./min respectively. The contents of tank (44) were pumped into flask (10) at 28.1 g./min once the silicate mixtures began flowing into the flask. Once the contents of the tanks had been exhausted the temperature of flask (10) was raised to 60° C. and maintained with agitation for 2 hours. After 2 hours, agitation was stopped and the aqueous layer was drained and the resin in excess solvent was washed free of acid and dried and the solvent stripped away under vacuum leaving 610 grams of viscous oil. The GPC Mn of the silicone resin was 1496, the GPC Mw was 2099, and the polydispersity as 1.4. The vinyl content of the silicone resin was 1.22% by weight.

Example 3

Another vinyl functional silicone resin was produced according to the above described method. Tank (20) was filled with 207.6 grams of vinyldimethylchlorosilane, 435.4 grams of trimethylchlorosilane and 1000 grams of tetraethylorthosilicate. Tank (24) was filled with 884.7 grams of absolute ethanol, 689.0 grams of distilled water and 257.3 grams of concentrated HCl. Flask (10) was filled with 500 grams of heptane. The contents of tanks (20) and (24) were pumped together utilizing static mixers at flow rates of 77.3 and 99.9 g./min respectively through age leg 38 which for this experiment was 12 feet of ¼ inch OD teflon tubing into flask (10). Once the addition had exhausted the contents of tanks (20) and (24), the temperature of flask (10) was brought to 60° C. and maintained for 2 hours. Agitation was ceased and the aqueous layer drained away and the resin in solvent washed free of acid with 3 aliquots of 250 mls of distilled water. The resin was dried and stripped of heptane under vacuum leaving 640 grams of a viscous oil. The resin was analyzed by GPC and the Mn was 1495, the Mw was 1908, with a polydispersity of 1.27. The vinyl content was 3.77% by weight.

Comparison Example 1

A commercially available MQ resin which was synthesized from sodium silicate was subjected to exhaustive functionalization by treatment with excess vinyldimethylchlorosilane (this silicone resin was essentially prepared according to the disclosure of Daudt et al. in U.S. Pat. No. 2,676,182). The functionalized resin was then vacuum stripped removing 95% of the excess chlorosilane, washed with water until neutral, dried, and submitted for GPC and Vinyl content analysis. The GPC Mn was 4352, the GPC Mw was 16490, and the polydispersity was 3.78. The vinyl content was measured 2.2% by weight.

Examples 4–7

The silicone resins of Examples 1, 2, 3, and Comparison Example 1 were next added to silicone release coatings, coated onto a substrate, cured and tested for release force. Next, an amount of each of the silicone resins were separately added to an organopolysiloxane having the general formula $ViMe_2SiO(Me_2SiO)_aSiMe_2Vi$ having a degree of polymerization of 30 until the resulting mixture reached a nominal viscosity of about 1000 centistokes. The amount of resin solids required to reach the viscosity target in each of the four mixtures is noted in Table I hereinbelow (denoted as Wt. % resin). Next, about 1.85 grams of a platinum catalyst (a soluble platinum complex containing 0.67% platinum formed from chloroplatinic acid and divinyltetramethyldisiloxane), and about 1.05 grams of bis(2-methoxy-1-methylethyl)maleate was added to each of the four mixtures and each mixture was stirred.

Next, about 40 or about 80 grams of each of the four mixtures prepared above containing the silicone resins were separately added to about 100 grams (denoted in Table I as a 40% solution or an 80% solution) of a mixture of: about 100 grams of an organopolysiloxane having the general formula $ViMe_2SiO(Me_2SiO)_aSiMe_2Vi$ having a degree of polymerization of 150 and containing approximately 2 methylvinylsiloxy units per chain, about 1.85 grams of a platinum catalyst (a soluble platinum complex containing 0.67% platinum formed from chloroplatinic acid and divinyltetramethyldisiloxane), and about 1.05 grams of bis(2-methoxy-1-methylethyl)maleate. Next, a trimethylsiloxy-endblocked-polydimethylsiloxanemethylhydrogensiloxane copolymer having a total average degree of polymerization of about 40 and about 70 mole percent methylhydrogen moiety on the siloxane chain at a ratio of 1.1:1 SiH to vinyl ratio (about 4 grams) was added to each of the four mixtures and the resulting mixtures were stirred. The four resulting curable coating compositions were then coated onto 54 lb SCK paper at 1.0 lb per ream coat weight in a blade over roll coater. The coating was immediately cured by passing the paper sheet through a 150° C. oven for 30 seconds. The coated sheets were aged overnight to allow the paper to rehydrate and then laminated with a commercially available hot melt adhesive backed paper. This Laminate was stored overnight and the release forces determined by pulling one inch by 12 inch long strips at three different velocities in a release force testing machine. The numbers reported in Table I are the average of 4 individual strip pulls. The velocities were 12 inches per min.(ipm), 400 inches per min., and 4000 inches per min. and the speed at which each sample was tested is denoted in Table I below. The release force is reported in grams in Table I. Release Coating I contained the silicone resin prepared in Example 1, Release Coating II contained the silicone resin prepared in Example 2, Release Coating III contained the silicone resin prepared in Example 3, and Release Coating IV contained the silicone resin prepared in Comparison Example 1.

TABLE I

| Release Coating | Wt. % Resin | % Solution | Release Speed (ipm) | Release Force (grams) |
| --- | --- | --- | --- | --- |
| I | 70.9 | 40 | 12 | 26.6 |
| II | 83.5 | 40 | 12 | 12.2 |
| III | 83.9 | 40 | 12 | 27.7 |
| IV | 40 | 40 | 12 | 17.7 |
| I | 70.9 | 40 | 400 | 29.6 |
| II | 83.5 | 40 | 400 | 28.7 |
| III | 83.9 | 40 | 400 | 41 |
| IV | 40 | 40 | 400 | 22.8 |
| I | 70.9 | 40 | 4000 | 53.9 |
| II | 83.5 | 40 | 4000 | 61 |
| III | 83.9 | 40 | 4000 | 68.3 |
| IV | 40 | 40 | 4000 | 47.6 |
| I | 70.9 | 80 | 12 | 370 |
| II | 83.5 | 80 | 12 | 127.5 |
| III | 83.9 | 80 | 12 | 410 |
| IV | 40 | 80 | 12 | 56.3 |
| I | 70.9 | 80 | 400 | 96.3 |
| II | 83.5 | 80 | 400 | 86.3 |
| III | 83.9 | 80 | 400 | 219.8 |
| IV | 40 | 80 | 400 | 37.2 |
| I | 70.9 | 80 | 4000 | 60.1 |
| II | 83.5 | 80 | 4000 | 114.2 |
| III | 83.9 | 80 | 4000 | 73.4 |
| IV | 40 | 80 | 4000 | 46.7 |

It can be seen from Table I hereinabove that the curable coating compositions of the instant invention containing the uniquely prepared silicone resins outperformed he comparative coating at higher release speeds.

That which is claimed is:

1. A curable silicone coating composition comprising:
   (A) an organosilicon compound having at least two olefinic hydrocarbon radicals per compound;
   (B) at least one organohydrogensilicon compound;
   (C) a platinum group metal-containing catalyst; and
   (D) a silicone resin prepared by the process of:
      (I) mixing in a continuous manner a silane selected from the group consisting of:
         (a) a silane having the formula $SiX_4$ wherein X is a halogen atom or a group having the formula OR wherein R is a group selected from the group consisting of alkyl groups having from 1 to 6 carbon atoms, aryl groups, and arylalkyl groups;
         (b) alcohol treated halogenated silanes; and
         (c) alkyl silicates having units of the formula

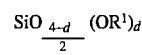

$$\mathrm{SiO}_{\frac{4-d}{2}}(OR^1)_d$$

or a partial hydrolysis condensate thereof, wherein $R^1$ is a group selected from the group consisting of alkyl groups having from 1 to 6 carbon atoms, aryl groups, and arylalkyl groups, and d has a value of from 1 to 3, with a condensation catalyst;
      (II) adding a quenching agent to the reaction mixture of (I), whereby an aqueous layer or condensation catalyst layer and an organic-silicone resin containing layer are formed;

(III) separating the aqueous layer or condensation catalyst layer from the organic-silicone resin containing layer; and (IV) stripping the organic-silicone resin containing layer, wherein the weight ratio of said silane to said condensation catalyst is constant throughout said process.

2. A composition according to claim 1, wherein (A) is selected from the group consisting of
ViMe$_2$SiO(Me$_2$SiO)$_a$SiMe$_2$Vi,
HexMe$_2$SiO(Me$_2$SiO)$_a$SiMe$_2$Hex,
Vi$_2$MeSiO(Me$_2$SiO)$_a$SiMeVi$_2$,
Hex$_2$MeSiO(Me$_2$SiO)$_a$SiMeHex$_2$, Vi$_3$SiO(Me$_2$SiO)$_a$SiVi$_3$,
Hex$_3$SiO(Me$_2$SiO)$_a$SiHex$_3$,
PhMeViSiO(Me$_2$SiO)$_a$SiPhMeVi,
HexMe$_2$SiO(Me$_2$SiO)$_a$(MeHexSiO)$_b$SiMe$_2$Hex,
ViMe$_2$SiO(Me$_2$SiO)$_a$(MeViSiO)$_b$SiMe$_2$Vi,
Hex$_2$MeSiO(Me$_2$SiO)$_a$(MeHexSiO)$_b$SiMeHex$_2$,
Vi$_2$MeSiO(Me$_2$SiO)$_a$(MeViSiO)$_b$SiMeVi$_2$,
Hex$_3$SiO(Me$_2$SiO)$_a$(MeHexSiO)$_b$SiHex$_3$, and
Vi$_3$SiO(Me$_2$SiO)$_a$(MeViSiO)$_b$SiVi$_3$, wherein Me, Vi, Hex, and Ph denote methyl, vinyl, 5-hexenyl and phenyl, respectively and a has a value of from 0 to 1000, and b has a value of from 0 to 100.

3. A composition according to claim 21, wherein (B) is selected from the group consisting of bis(trimethylsiloxy)dimethyldihydrogendisiloxane, heptamethylhydrogentrisiloxane, hexamethyldihydrogentrisiloxane, methylhydrogencyclosiloxanes, pentamethylpentahydrogencyclopentasiloxane, pentamethylhydrogendisiloxane, polymethylhydrogensiloxanes, tetramethyltetrahydrogencyclotetrasiloxane, tetramethyldihydrogendisiloxane, and methylhydrogendimethylsiloxane copolymers.

4. A composition according to claim 1, wherein (C) is selected from chloroplatinic acid or chloroplatinic acid-divinyltetramethyldisiloxane complexes.

5. A composition according to claim 1, wherein (a) is selected from the group consisting of tetramethoxysilane, tetraethoxysilane, and tetrapropoxysilane.

6. A composition according to claim 1, wherein the halogenated silane of (b) is selected from the group consisting of trimethylchlorosilane, triethylchlorosilane, trimethylbromosilane, triethylbromosilane, trimethylfluorosilane, triethylfluorosilane, dimethylvinylchlorosilane, and dimethyl-5-hexenylchlorosilane.

7. A composition according to claim 1, wherein the alcohol of (b) is selected from the group consisting of ethanol, methanol, and isopropanol.

8. A composition according to claim 1, wherein (c) is ethylpolysilicate.

9. A composition according to claim 1, wherein the condensation catalyst is selected from the group consisting of hydrochloric acid, sulfuric acid, and sulfonic acids.

10. A composition according to claim 1, wherein the quenching agent is a silane having the formula R$^5$R$^6$R$^7$SiZ wherein R$^5$, R$^6$ and R$^7$ are selected from hydrogen, alkyl groups having from 1 to 12 carbon atoms, alkenyl groups having from 2 to 12 carbon atoms, aryl groups, arylalkyl groups, or perfluoroalkylethyl groups having the formula C$_n$F$_{2n+1}$CH$_2$CH$_2$ where n is 1 to 6, and Z is a halogen atom or is a group having the formula OR$^8$ wherein R$^8$ is a group selected from the group consisting of alkyl groups having from 1 to 6 carbon atoms, aryl groups, and arylalkyl groups.

11. A composition according to claim 1, wherein the quenching agent is a disiloxane selected from the group consisting of tetramethyldisiloxane, hexamethyldisiloxane, tetramethyldivinylsiloxane, tetramethyldi-5-hexenylsiloxane, tetramethyl-3,3,3-trifluoropropyldisiloxane, tetramethyldiethylsiloxane, tetramethyldiphenyldisiloxane, and diethyldiphenyldivinyldisiloxane.

12. A composition according to claim 1, wherein the quenching agent further comprises an organic solvent.

13. A composition according to claim 12, wherein the organic solvent is selected from the group consisting of heptane and xylene.

14. A composition according to claim 1, wherein the composition further comprises an inhibitor which inhibits the catalytic activity of the platinum group metal containing catalyst.

15. A composition according to claim 14, wherein the inhibitor is selected from the group consisting of maleates and fumarates.

16. A composition according to claim 14, wherein the composition further comprises a bath life extender compound.

17. A composition according to claim 16, wherein the bath life extender compound is a compound selected from the group consisting of compounds which contain one or more primary or secondary alcohol groups, carboxylic acids, cyclic ethers, and water.

18. A composition according to claim 1, wherein the composition further comprises a diluent.

19. A curable silicone coating composition comprising:
  (A) an organosilicon compound having at least two olefinic hydrocarbon radicals per compound;
  (B) at least one organohydrogensilicon compound;
  (C) a platinum group metal-containing catalyst; and
  (D) a silicone resin prepared by the process of:
    (I) mixing in a continuous manner a silane selected from the group consisting of:
      (i) alkoxysilanes,
      (ii) halogenated silanes, and
      (iii) alkyl silicates with a silicon compound selected from the group consisting of:
      (iv) trialkylhalosilanes and
      (v) disiloxanes;
    (II) adding an alcohol to the mixture of (I);
    (III) adding water or a mixture of water and a condensation catalyst to the mixture of (II) whereby an aqueous layer and an organic-silicone resin containing layer are formed;
    (IV) separating the aqueous layer from the organic-silicone resin containing layer;
    (V) stripping the organic-silicone resin containing layer; wherein the weight ratio of said silane to said water or to said mixture of water and condensation catalyst is constant throughout said process.

20. A composition according to claim 19, wherein (A) is selected from the group consisting of
ViMe$_2$SiO(Me$_2$SiO)$_a$SiMe$_2$Vi,
HexMe$_2$SiO(Me$_2$SiO)$_a$SiMe$_2$Hex,
Vi$_2$MeSiO(Me$_2$SiO)$_a$SiMeVi$_2$,
Hex$_2$MeSiO(Me$_2$SiO)$_a$SiMeHex$_2$, Vi$_3$SiO(Me$_2$SiO)$_a$SiVi$_3$,
Hex$_3$SiO(Me$_2$SiO)$_a$SiHex$_3$,
PhMeViSiO(Me$_2$SiO)$_a$SiPhMeVi,
HexMe$_2$SiO(Me$_2$SiO)$_a$(MeHexSiO)$_b$SiMe$_2$Hex,
ViMe$_2$SiO(Me$_2$SiO)$_a$(MeViSiO)$_b$SiMe$_2$Vi,
Hex$_2$MeSiO(Me$_2$SiO)$_a$(MeHexSiO)$_b$SiMeHex$_2$,
Vi$_2$MeSiO(Me$_2$SiO)$_a$(MeViSiO)$_b$SiMeVi$_2$,
Hex$_3$SiO(Me$_2$SiO)$_a$(MeHexSiO)$_b$SiHex$_3$, and
Vi$_3$SiO(Me$_2$SiO)$_a$(MeViSiO)$_b$SiVi$_3$, wherein Me, Vi, Hex, and Ph denote methyl, vinyl, 5-hexenyl and phenyl, respectively and a has a value of from 0 to 1000, and b has a value of from 0 to 100.

21. A composition according to claim 19, wherein (B) is selected from the group consisting of bis(trimethylsiloxy)dimethyldihydrogendisiloxane, heptamethylhydrogentrisiloxane, hexamethyldihydrogentrisiloxane, methylhydrogencyclosiloxanes, pentamethylpentahydrogencyclopentasiloxane, pentamethylhydrogendisiloxane, polymethylhydrogensiloxanes, tetramethyltetrahydrogencyclotetrasiloxane, tetramethyldihydrogendisiloxane, and methylhydrogendimethylsiloxane copolymers.

22. A composition according to claim 19, wherein (C) is selected from chloroplatinic acid or chloroplatinic acid-divinyltetramethyldisiloxane complexes.

23. A composition according to claim 19, wherein (i) is selected from the group consisting of tetramethoxysilane, tetraethoxysilane, and tetrapropoxysilane.

24. A composition according to claim 19, wherein (ii) is tetrachlorosilane.

25. A composition according to claim 19, wherein (iii) is ethylpolysilicate.

26. A composition according to claim 19, wherein (iv) is selected from the group consisting of trimethylchlorosilane, triethylchlorosilane, trimethylbromosilane, triethylbromosilane, trimethylfluorosilane, triethylfluorosilane, dimethylvinylchlorosilane, and dimethyl-5-hexenylchlorosilane.

27. A composition according to claim 19, wherein (v) is selected from the group consisting of tetramethyldisiloxane, hexamethyldisiloxane, tetramethyldivinylsiloxane, tetramethyldi-5-hexenylsiloxane, tetramethyl-3,3,3-trifluoropropyldisiloxane, tetramethyldiethylsiloxane, tetramethyldiphenyldisiloxane, and diethyldiphenyldivinyldisiloxane.

28. A composition according to claim 19, wherein the alcohol is selected from the group consisting of ethanol, methanol, and isopropanol.

29. A composition according to claim 19, wherein the condensation catalyst is selected from the group consisting of hydrochloric acid, sulfuric acid, and sulfonic acids.

30. A composition according to claim 19, further comprising heating the mixture after step (III).

31. A composition according to claim 19, wherein the composition further comprises an inhibitor which inhibits the catalytic activity of the platinum group metal containing catalyst.

32. A composition according to claim 31, wherein the composition further comprises a bath life extender compound.

33. A composition according to claim 19, wherein the composition further comprises a diluent.

34. A process for preparing a laminate of a substrate and an adhesive wherein the adhesive will release from the substrate, the process comprising the steps of:

(I) coating a curable silicone coating composition on the surface of the substrate wherein the composition comprises:
  (A) an organosilicon compound having at least two olefinic hydrocarbon radicals per compound;
  (B) at least one organohydrogensilicon compound;
  (C) a platinum group metal-containing catalyst; and
  (D) a silicone resin prepared by the process of:
    (I) mixing in a continuous manner a silane selected from the group consisting of:
      (a) a silane having the formula $SiX_4$ wherein X is a halogen atom or a group having the formula OR wherein R is a group selected from the group consisting of alkyl groups having from 1 to 6 carbon atoms, aryl groups, and arylalkyl groups;
      (b) alcohol treated halogenated silanes; and
      (c) alkyl silicates having units of the formula

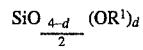

or a partial hydrolysis condensate thereof, wherein $R^1$ is a group selected from the group consisting of alkyl groups having from 1 to 6 carbon atoms, aryl groups, and arylalkyl groups, and d has a value of from 1 to 3, with a condensation catalyst;
    (II) adding a quenching agent to the reaction mixture of (I), whereby an aqueous layer or condensation catalyst layer and an organic-silicone resin containing layer are formed;
    (III) separating the aqueous layer or condensation catalyst layer from the organic-silicone resin containing layer; and
    (IV) stripping the organic-silicone resin containing layer, wherein the weight ratio of said silane to said condensation catalyst is constant throughout said process;
(II) exposing the coating and the substrate to an energy source selected from the group consisting of (i) heat and (ii) actinic radiation in an amount sufficient to cure the coating; and
(III) applying a pressure sensitive adhesive on the coating.

35. A process for preparing a laminate of a substrate and an adhesive wherein the adhesive will release from the substrate, the process comprising the steps of:

(I) coating a curable silicone coating composition on the surface of the substrate wherein the composition comprises:
  (A) an organosilicon compound having at least two olefinic hydrocarbon radicals per compound;
  (B) at least one organohydrogensilicon compound;
  (C) a platinum group metal-containing catalyst; and
  (D) a silicone resin prepared by the process of:
    (I) mixing in a continuous manner a silane selected from the group consisting of:
      (i) alkoxysilanes,
      (ii) halogenated silanes, and
      (iii) alkyl silicates with a silicon compound selected from the group consisting of:
      (iv) trialkylhalosilanes and
      (v) disiloxanes;
    (II) adding an alcohol to the mixture of (I);
    (III) adding water or a mixture of water and a condensation catalyst to the mixture of (II) whereby an aqueous layer and an organic-silicone resin containing layer are formed;
    (IV) separating the aqueous layer from the organic-silicone resin containing layer;
    (V) stripping the organic-silicone resin containing layer; wherein the weight ratio of said silane to said water or to said mixture of water and condensation catalyst is constant throughout said process;
(II) exposing the coating and the substrate to an energy source selected from the group consisting of (i) heat and (ii) actinic radiation in an amount sufficient to cure the coating; and
(III) applying a pressure sensitive adhesive on the coating.

* * * * *